Jan. 7, 1936.  L. F. HOLLY  2,026,834
SEPARATING APPARATUS
Filed July 22, 1932   2 Sheets-Sheet 2
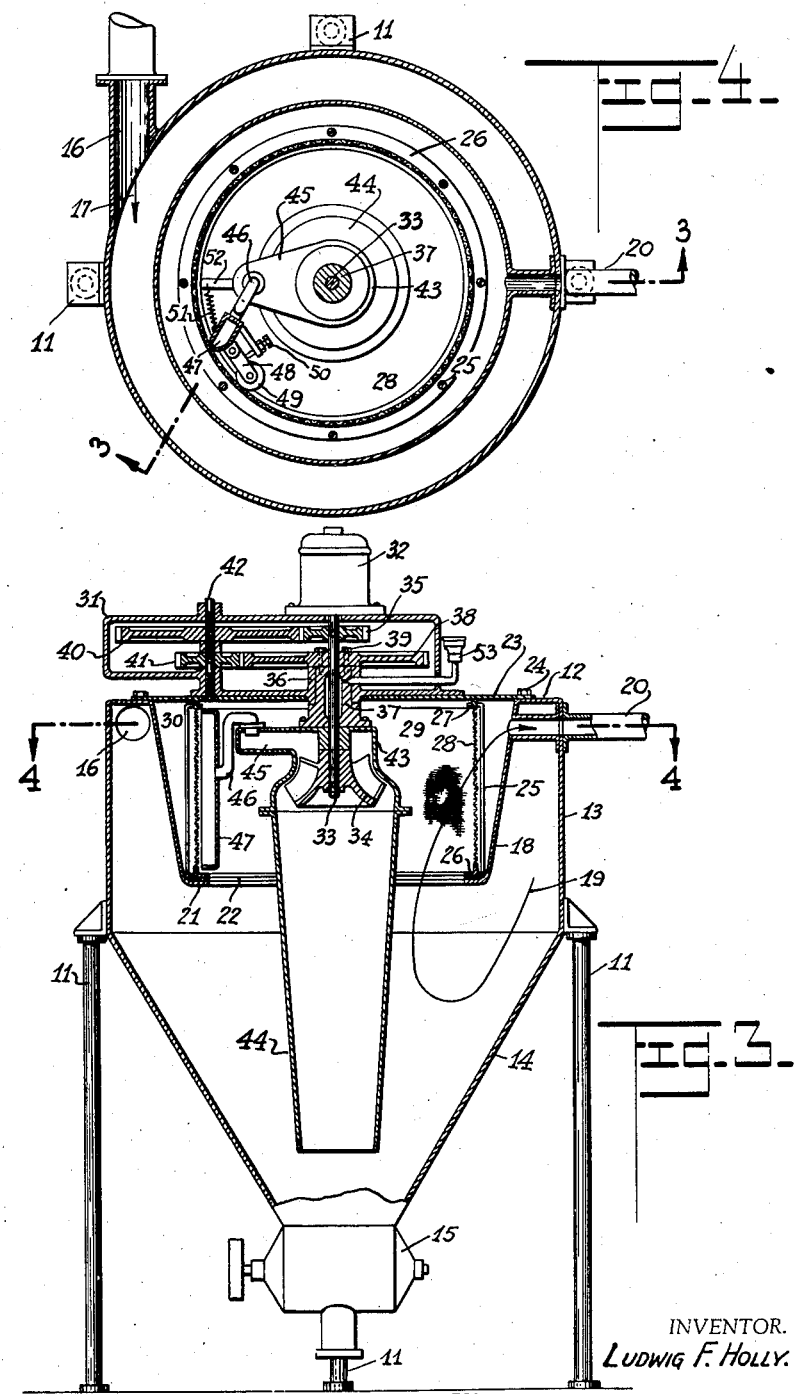
INVENTOR.
LUDWIG F. HOLLY.
BY
ATTORNEY.

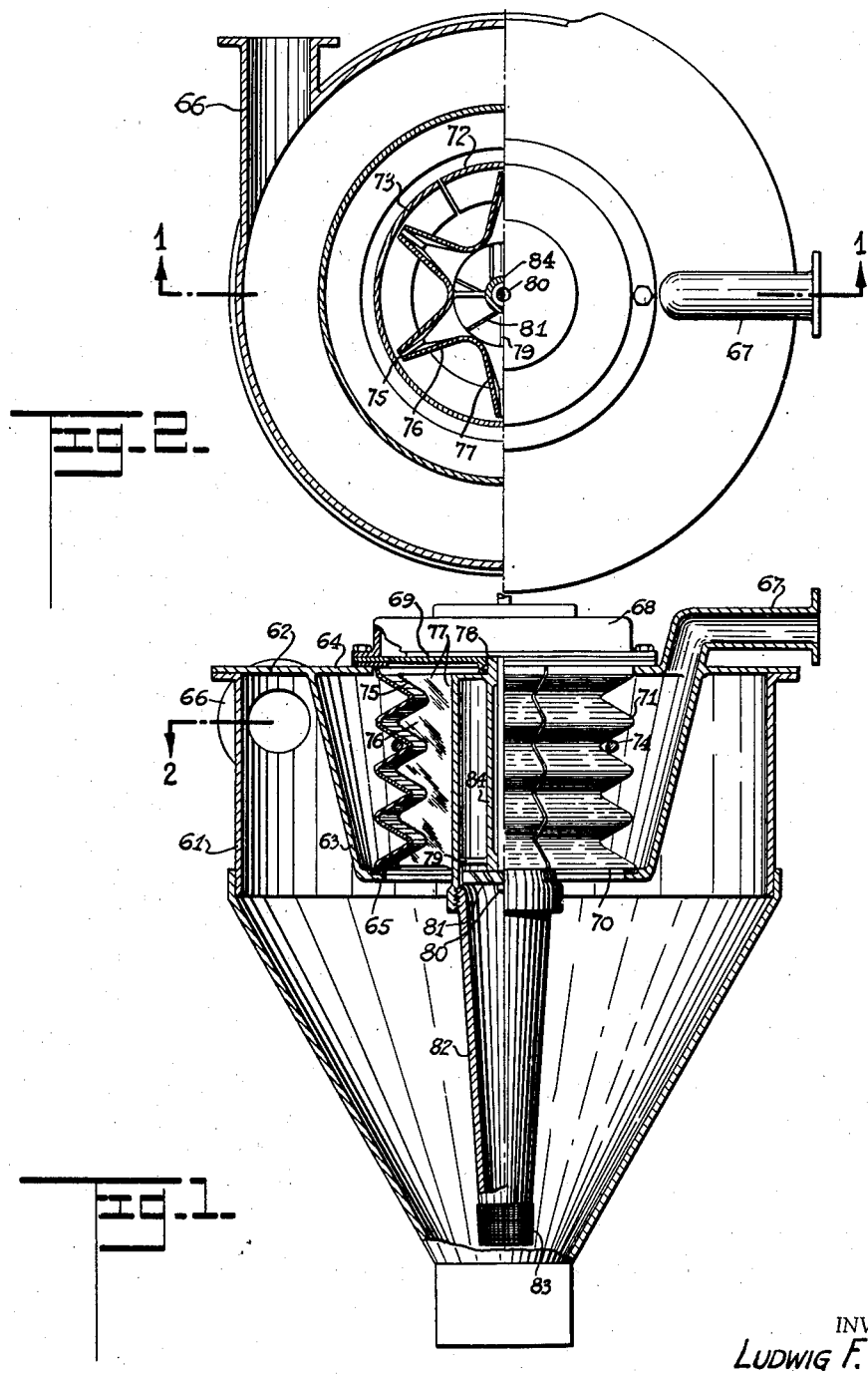

Patented Jan. 7, 1936

2,026,834

UNITED STATES PATENT OFFICE 2,026,834

SEPARATING APPARATUS

Ludwig F. Holly, Madison, N. J.

Application July 22, 1932, Serial No. 624,073

8 Claims. (Cl. 183—61)

For the separation of solid matter entrained in air or gases a large variety of apparatus and methods has been used in the past. Among these the centrifugal separator and the filter are prominent.

This invention concerns improvements in the filter, by itself as well as in combination with the centrifugal separator, and an adaptation of the latter for the combined use is also involved.

A commonly used type of centrifugal separators has a vertical enclosure, cylindrical at the top and conically contracted towards the bottom. The dust laden fluid is admitted to the cylindrical portion and is deflected by the inside of the wall of the enclosure into a circular path, creating a vortex whirling downwardly around the axis of the cylinder and cone. The particles suspended in the fluid follow gravity and fall in a more or less curved path to the bottom of the cone. The clean fluid travels out of the enclosure through a pipe, which extends through the top of the enclosure partways down thereinto.

Apparatus of this kind is subject to definite limitations of the efficiency of separation. Thus for instance small and light particles possessing only a comparatively small mass do not attain the centrifugal force necessary in order to separate them from the air or gas. Instead these fine solids follow the air current and are delivered with the air.

For this reason, where a higher degree of separation is required, a different device is used, which commonly is termed filter.

The dust laden air or gas is forced through a more or less porous medium, like cloth, felt, steel or glass wool, coke, etc. Depending on the filtering medium used, the solids will be held at the surface thereof or penetrate to a certain depth. The layer of dust particles or solids accumulating on the filter at a more or less uniform rate is periodically removed by various methods. Some devices have, for instance, filter cloth spread over frames, which, from time to time are mechanically vibrated.

Bag filters have also been used for separating solids from air or gases. The solids retained on the inner surface of the bag are removed by periodically shaking the bags.

Other filter devices, especialy those using metal wool, coke, etc., remove the dust particles from the surface or the filter bed by periodically flushing them with water or oil.

All of these filters,—relying on periodical removal of the separated solids accumulated on or in the filter medium,—have one disadvantage in common. Obviously the solids, when allowed to accumulate for any length of time, fill the pores and interstices of the filter medium and hinder the free passage of air or gas. Besides they cover the surface of the filter,—where the air enters,— to a certain height forming a more or less impervious mass further restricting the free passage of the air. Thus it becomes necessary, either to apply high pressure to the air, to provide a very large filter area, or to encumber the apparatus by providing more frequent removal of the collected solids. These remedies involve economical disadvantages, i. e., greater initial, operating or maintenance expenses, and waste of space, too.

One object of this invention is to combine the desirable features of centrifugal separators and filters, using a novel continuous method of removing the separated solids from the filter medium.

A further object of this invention is to utilize space in a centrifugal separator, which, though necessarily provided therein in accordance with the ordinary separator design, does not serve any useful purpose in connection with centrifugal separation.

An important new result involved in these present improvements is the elimination of the compartments, partitions and conduits which were necessary in the separating apparatus of the prior art, so that I avoid frictional losses and mechanical complication, facilitate maintenance, and gain cleanlines because in the arrangement of said parts even a skillful designer cannot eliminate pockets and corners, in which the dust collects. Furthermore, the apparatus of my invention operates continuously; there are no intermittent gearing and timing devices.

Although I combine centrifugal separator and filter, my novel arrangement results in direct delivery of the respectively separated coarse and fine matter at a common point; on the other hand the different matters removed in different grades of fineness may also readily be delivered separately, if so desired.

Simplified and rugged construction, and evenly balanced operating characteristics of the separating apparatus are made possible by my invention and other objects will be brought forth in the following description, in connection with the accompanying drawings. Of course the improvement is capable of extended application and is not confined to the exact showing of the drawings nor to the precise construction described;

but, such changes and modifications may be made which conform to the spirit of this invention and do not exceed the scope thereof as expressed in the appended claims.

The drawings are schematic inasmuch as no particular attention is paid to the proportionate sizes of compartments, conduits and parts, nor to mechanical details, which are known to those acquainted with this art.

In the drawings,

Fig. 1 shows the partly cross-sectioned elevation of one modification of my invention.

Fig. 2 shows a corresponding partly sectioned top view.

Fig. 3 shows a complete outline of a modified separating apparatus in a cross-sectioned elevation.

Fig. 4 shows a corresponding sectioned top view.

The sections along which views of Figs. 1 and 2, and 3 and 4 are taken, are indicated by reference numerals in Figs. 2 and 1, and Figs. 4 and 3, respectively.

The sets of Figs. 1 and 2, and Figs. 3 and 4 show various separate modifications, which are of course not restricted to the respective apparatus, but which may suitably and exchangeably be applied to the apparatus of the other set.

Similar numerals refer to similar parts throughout the various views.

Figs. 3 and 4 show a conventional stand 11 supporting a centrifugal separator with a top plate 12, a cylindrical part 13, a lower conical part 14, and an outlet gate at 15, at the bottom, all of which parts are known to those acquainted with this art.

The fluid from which solids are to be separated is introduced in the direction of arrow 17 through the inlet pipe 16, which tangentially merges with the cylindrical part 13. The fluid whirls around the container and the heavy solids drop down onto the top of the outlet gate 15, whereas the fluid continues its path,—generally in the direction of arrow 19,—around the bottom of the tubular insert 18, which substantially centrally depends from the top plate 12. The fluid issues from the separator through an outlet 20.

The tubular insert 18 is contracted at its bottom in a rim 21. On top of said rim rests a gasket 22, a compressible rubber gasket for instance. The top plate 12 is open at the center substantially to the diameter of the tubular insert 18 merging therewith. This center opening of the top plate 12 is closed by a plate 23 which is removably fastened on top of plate 12 by means of the screws 24. From plate 23 depends a framework indicated by rods forming the cage 25. The said cage carries at its lower end an annular flange 26. Between said flange 26 and a suitable rim 27 on the bottom of plate 23 is stretched the tubular filter 28, made of filter cloth for instance.

The filter 28 divides the inside of the tubular insert into an inner chamber 29, and an outer chamber 30, the fluid travelling along the path of arrow 19 passing from chamber 29 to chamber 30 through the filter 28, by means of which finer solids or dust are removed therefrom.

It is understood that upon removal of the plate 23, from the top plate 12, the said filter 28 and also the other parts depending therefrom, and to be described later on, are lifted out of the centrifugal separator.

The cage 25 spaces the flange 26 at such a distance downward from plate 23, that it comes to rest upon the gasket 22 and is sealed thereby against the rim 21, when the entire center part mounted on plate 23 is inserted in the centrifugal separator.

Upon the top of plate 23 is mounted a gear housing 31. On top of gear housing 31 is vertically mounted a motor 32. The shaft 33 of said motor extends down, a propeller 34 is mounted thereupon at the lower end; the pinion 35 is mounted on shaft 33 in the gear housing 31, near the top thereof, and the said shaft rotatably extends through and is journalled where necessary in the parts located beyond propeller 34 and the pinion 35, which parts will be described presently. The gear housing 31 is provided with a center hub 36 which rotatably accommodates an arbor 37, the necessary lubrication for said rotating arbor 37 and shaft 33 being provided by means of a lubricating system 53 extending from said hub to the outside of housing 31.

The arbor 37 is thrustwise retained in the hub 36 by means of a gear 38, which is concentrically assembled with arbor 37 by means of screws 39. The gear 38 connects the arbor 37 to the pinion 35 by means of an intermediary reduction. Said reduction comprises the larger gear 40 meshing with pinion 35 and pinion 41 meshing in gear 38, said gear 40 and said pinion 41 being assembled upon a stud 42 which is journalled in the gear housing 31. Upon the lower end of arbor 37 is mounted an angular duct 43, which rotates therewith, the downward branch of which is shaped to fit around propeller 34 and which opens in that direction by way of an extension 44 attached thereto.

The horizontal branch 45 of angular duct 43 has an opening at its top, in which a suitably shaped pipe 46 is swingably mounted. Pipe 46 carries a vertically extended nozzle 47 at its end. From said nozzle extends an arm 48 which carries a roller 49 travellably engaged upon filter 28. There is an adjustable set screw 50 upon an extension of nozzle 47 by means of which the arm 48 may be placed in such a position that the said nozzle just clears the filter 28, when the angular duct 43 is slowly and continuously rotated relatively to the filter.

A spring 51 is tensioned between the nozzle 47 and a hook 52 extending from the horizontal branch 45 of the angular duct.

The spring 51 retains the roller 49 in engagement upon the inside of filter 28 so that the nozzle 47 is spacedly disposed in relation to said filter. If the filter has an odd shape, not the circular shape of the drawing, this arrangement allows the nozzle 47 to be retained in operative relationship thereto.

It is understood that the angular duct 43 and the parts mounted thereon, rotate slowly, whereas a greater speed is imparted to propeller 43. The slowly rotating angular duct 43 continuously carries the nozzle 47, in a scanning motion, over the inside of the filter, upon which a layer of the dust to be removed from the fluid is deposited. The propeller 34 presses the fluid contained in angular duct 43 downwardly, rarefying the air at the terminal of the nozzle 47 so that the parts of the filter scanned by nozzle 47 are cleaned by suction.

The fluid which is pressed down by propeller 34 leaves the lower end of extension 44 just above the gate 15, upon which the dust conveyed by the fluid is deposited. The fluid itself arises in the centrifugal separator, and mixes with the fluid circulated therein.

The modification illustrated in Figs. 1 and 2, shows a centrifugal separator 61 similar to that of Figs. 3 and 4. In this instance, the central opening in the top plate 62 is smaller than the tubular insert 63, so that said tubular insert is inwardly confronted by a rim 64 at said top and rim 65 at the bottom.

The separator inlet 66 is arranged in this instance as before, but the outlet 67 does not pass through the outer chamber of the centrifugal separator, but leaves the enclosure through the rim 64. The gear housing 68 with base plate 69 is again placed right on top of the centrifugal separator. The motor is not shown. The gear housing rests however on the rim 64, a gasket 69 being interposed between the plates. Between said gasket, and the lower gasket 70, on rim 65, again extends a filter 71. But in this instance I show a self-supporting filter made of porous stone for instance. It is made in two halves 72 and 73, so as to permit it to be assembled around the cleaning member. The two halves 72 and 73 may be held together by a tensil loop 74 extended therearound. The filter in this instance is longitudinally corrugated and the cleaning members or nozzles 75 at the end of the arms 76 of the star shaped cleaning chamber 77 are shaped correspondingly. The cleaning chamber 77 is suspended from a slowly driven gear in housing 68, by means of a shank 78. A bearing 84 extends through the length of cleaning chamber 77 and is supported by spokes 79 at the lower end thereof. Said bearing rotatably supports the fast revolving shaft 80 of the motor. Upon the end of said shaft is mounted the propeller 81. Said propeller sucks the air from the star shaped chamber 77 above into the outlet pipe 82 below, said pipe being threadedly engaged upon the bottom of the chamber 77. On the lower end of the pipe 82 I show a screen sleeve 83, which may extend right close to the gate below, so that the dust removed from the filter drops onto the gate whereas the fluid returns upwardly through the screen sleeve 83 into the chamber of the centrifugal separator 61.

The corrugations of the filter are arbitrary; any other preferred shape may be given to the filter, by which its surface is increased. If the filter is circular, the cleaning member may be solid (77). If the filter is not circular, the yieldable arrangement of Figs. 3 and 4 may be used.

Although I have shown and described one form of embodiment of my invention in detail, yet I do not wish to be limited thereby, except as the state of the art and the appended claims may require, for it is obvious that various modifications and changes may be made in the form of embodiment of my invention, without departing from the spirit and scope thereof.

What I claim is:—

1. In combination with a centrifugal separator removing solids from fluids, a filter interposed in the fluid outlet of said separator, fluid conveying means in said separator facing at one end a section of said filter and discharging towards the outlet for said solids at its other end, and means propelling the fluid in said means away from said filter and applying suction to said section.

2. In combination with a centrifugal separator removing solids from fluids, a filter interposed in the fluid outlet of said separator, fluid conveying means in said separator facing at one end a section of said filter and discharging towards the outlet for said solids at its other end, means propelling the fluid in said means away from said filter and applying suction to said section, and a mechanism moving said conveying means relatively to said filter.

3. In combination with a centrifugal separator removing solids from fluids, a filter interposed in the fluid outlet of said separator, fluid conveying means in said separator facing at one end a section of said filter and discharging towards the outlet for said solids at its other end, means propelling the fluid in said means away from said filter and applying suction to said section, and a mechanism moving said conveying means relatively to said filter, and operatively connected with said propelling means.

4. In a separating apparatus, a centrifugal separator, an annular filtering chamber depending into said separator, spaced in said separator to allow free circulation around the outside of said chamber to its inside around the bottom thereof and comprising a wall extending around a filter surface, and rotatable filter cleaning means substantially centrally depending into said filtering chamber and separator, engaged upon said filter surface, and discharging downward into said separator.

5. In a separating apparatus, a centrifugal separator, an outlet pipe depending from the top of said separator thereinto and issuing therefrom, a cylindrical filter in said pipe and engaged between the lower end thereof and said top of said separator, cleaning means engaged upon the inside of said filter, and a discharge conduit connected with said cleaning means, and discharging into the bottom of said separator.

6. In a separating apparatus, the combination of a gas discharge chamber, a filter closing the inlet of said chamber, a centrifugal separating chamber surrounding said discharge chamber, the gas outlet of said separating chamber being connected with the inlet of said discharge chamber, and suction means operatively engaged upon said filter and downwardly discharging into said separating chamber.

7. In combination with a corrugated filter, a suction device for cleaning said filter, and a suction nozzle on said device and notched to register with corrugations of said filter.

8. In a circular, corrugated filter, a central filter cleaning device engaged upon corrugations of said filter, said filter being assembled in sectors around said cleaning device.

LUDWIG F. HOLLY.